United States Patent
Cauley et al.

(10) Patent No.: US 7,621,226 B2
(45) Date of Patent: *Nov. 24, 2009

(54) SYSTEM AND METHOD FOR RECYCLING WASTE INTO ENERGY

(75) Inventors: Phillip L. Cauley, Bullard, TX (US); Tracy L. Edwards, Flint, TX (US)

(73) Assignee: Natural Resource Recovery, Inc., Elk City, OK (US)

( * ) Notice: Subject to any disclaimer, the term of this patent is extended or adjusted under 35 U.S.C. 154(b) by 432 days.

This patent is subject to a terminal disclaimer.

(21) Appl. No.: 11/320,936

(22) Filed: Dec. 29, 2005

(65) Prior Publication Data

US 2007/0000768 A1    Jan. 4, 2007

Related U.S. Application Data

(60) Provisional application No. 60/595,416, filed on Jul. 1, 2005.

(51) Int. Cl.
 *F23G 5/12* (2006.01)
(52) U.S. Cl. .......... 110/229; 110/110; 110/101 R; 110/118; 110/219; 110/234; 110/101 CC
(58) Field of Classification Search .......... 110/229, 110/242, 110, 101 R, 190, 118, 219, 234, 110/101 CC; 73/40
See application file for complete search history.

(56) References Cited

U.S. PATENT DOCUMENTS

| | | | | |
|---|---|---|---|---|
| 3,780,676 A | * | 12/1973 | Hazzard et al. | 110/187 |
| 4,308,809 A | * | 1/1982 | Woods | 110/346 |
| 4,439,209 A | * | 3/1984 | Wilwerding et al. | 48/76 |
| 4,452,154 A | * | 6/1984 | Kono et al. | 110/346 |
| 4,624,417 A | | 11/1986 | Gangi | |
| 4,769,149 A | | 9/1988 | Nobilet et al. | |
| 4,857,458 A | | 8/1989 | Nobilet et al. | |
| 4,872,949 A | | 10/1989 | Wilwerding | |
| 4,882,903 A | | 11/1989 | Lowry Jr. et al. | |
| 5,143,000 A | * | 9/1992 | Camacho | 110/250 |
| 5,221,756 A | * | 6/1993 | Fleisher et al. | 549/418 |
| 5,411,714 A | * | 5/1995 | Wu et al. | 422/232 |
| 5,423,456 A | * | 6/1995 | Arendonk et al. | 222/54 |
| 5,429,645 A | | 7/1995 | Benson et al. | |
| 5,553,554 A | * | 9/1996 | Urich, Jr. | 110/211 |

(Continued)

FOREIGN PATENT DOCUMENTS

JP   06123419 A * 6/1994

*Primary Examiner*—Kenneth B Rinehart
(74) *Attorney, Agent, or Firm*—Browning Bushman, P.C.

(57) ABSTRACT

A system for recycling solid waste into energy includes a heated enclosure 66, one or more input conveyors 60, 67 move waste materials through the heated enclosure, provide a flow line with a temperature gradient of at least 150 F.°, and mechanically move the waste particles and the residual solids along the flow line. A heated rotary drum 74 is in fluid communication with the flow line, and condenser unit 94, 98 receive vapors from the flow line and the rotary drum and output hydrocarbons. One or more discharge conveyors 76 discharge carbon black from the rotary drum. Control valves 80, 82 seal a vacuum downstream from the discharge conveyors, and control valves 34, 46 seal vacuum upstream from the one or more input conveyors. Various types of vacuum pumps may be used to maintain a selected vacuum between the control valves.

48 Claims, 9 Drawing Sheets

U.S. PATENT DOCUMENTS

| | | | |
|---|---|---|---|
| 5,720,232 A * | 2/1998 | Meador | 110/346 |
| 5,915,308 A * | 6/1999 | May et al. | 110/165 R |
| 5,996,512 A | 12/1999 | Morin | |
| 6,032,591 A | 3/2000 | Morin et al. | |
| 6,294,212 B1 * | 9/2001 | Huber et al. | 426/238 |
| 6,629,450 B2 * | 10/2003 | Lu et al. | 73/40 |
| 6,848,375 B2 | 2/2005 | Kasin | |
| 6,938,562 B2 | 9/2005 | Pope | |
| 2004/0103831 A1 | 6/2004 | Pope | |
| 2004/0192980 A1 | 9/2004 | Appel et al. | |
| 2005/0005772 A1 * | 1/2005 | Spani | 96/200 |
| 2005/0082144 A1 * | 4/2005 | Maupin et al. | 198/659 |

\* cited by examiner

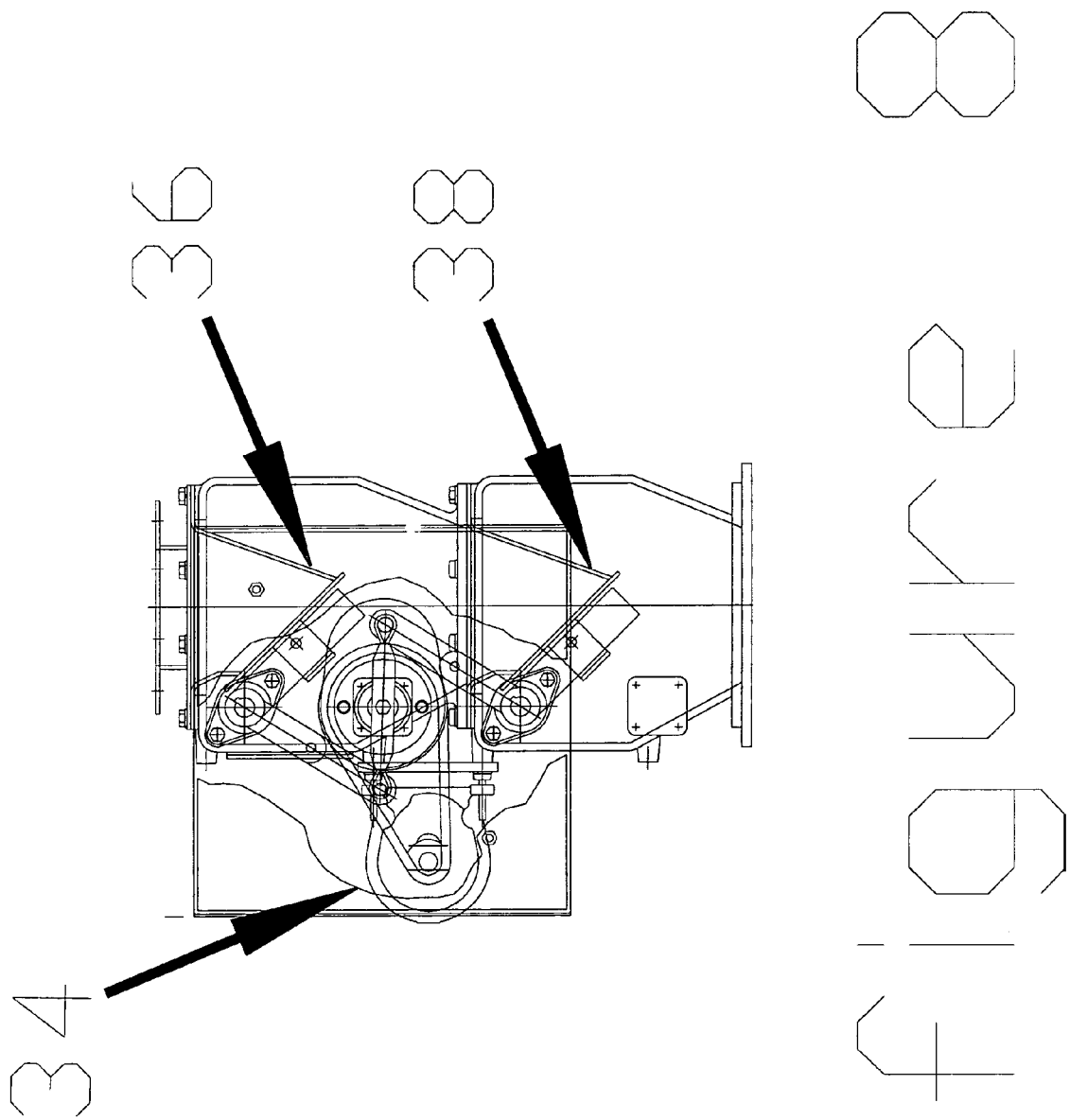

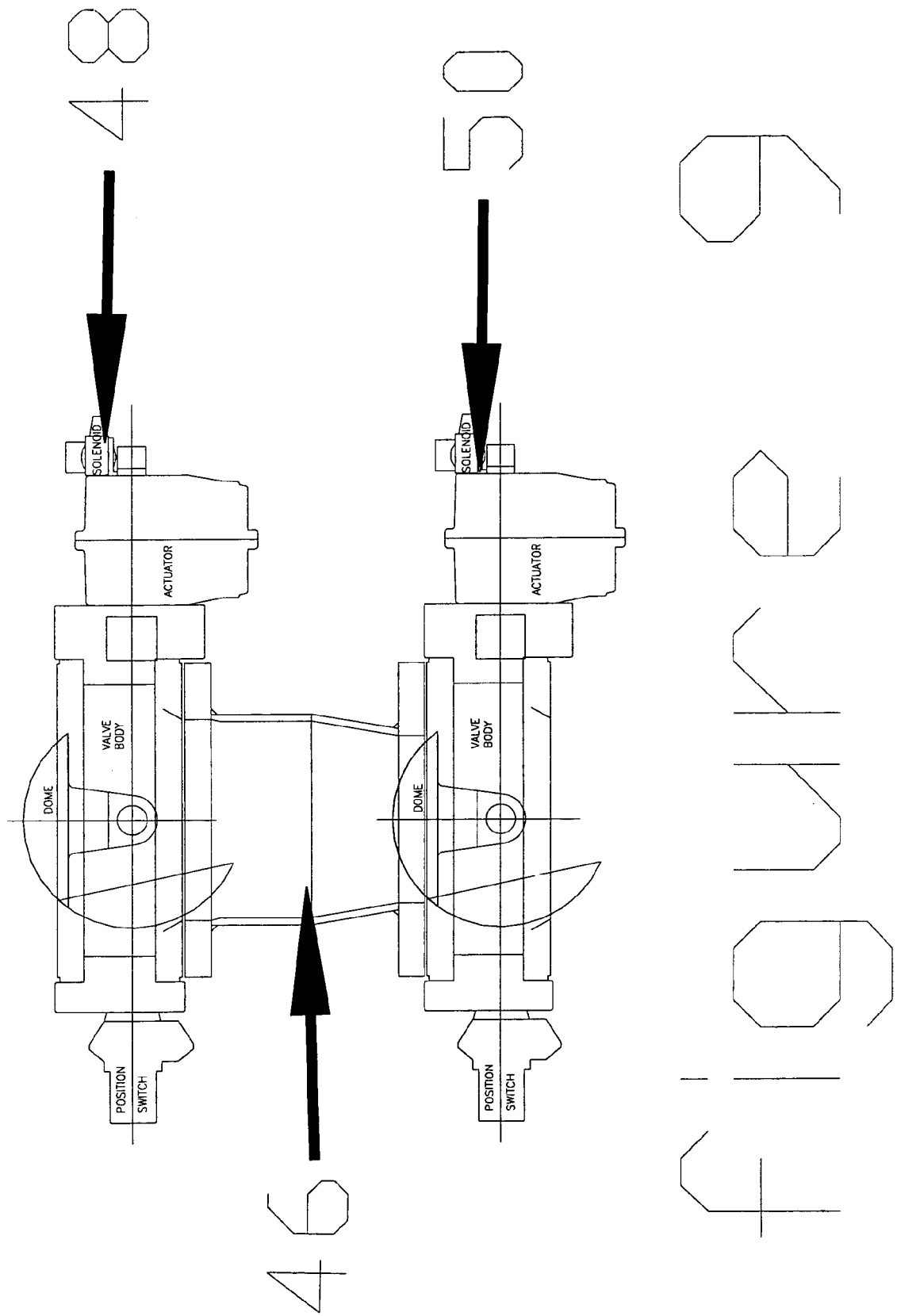

SYSTEM AND METHOD FOR RECYCLING WASTE INTO ENERGY

RELATED CASE

This application claims priority from U.S. Ser. No. 60/595,416 filed Jul. 1, 2005.

FIELD OF THE INVENTION

The present invention relates to equipment and techniques for recycling waste into energy, wherein a heated enclosure and a condenser operate under a selected vacuum maintained by a vacuum pump. Waste material is moved through the heated enclosure in a first direction, while hydrocarbon vapors are drawn toward the condenser in an opposing second direction.

BACKGROUND OF THE INVENTION

Various types of devices have been experimentally used for recycling waste into energy. Some devices are particularly intended for disposing of solid waste, such as rubber particles from used tires. One type of experimental device utilized a heated enclosure with an interior chamber and a conveyor for inputting waste particles to the heated enclosure. A condenser received vapors from the heated enclosure and output liquid hydrocarbons and gas hydrocarbons. Vacuum pumps have been used in some experimental units to maintain a selected vacuum within the heated enclosure, such that hydrocarbon vapors are drawn from the heated enclosure to the condenser. The prior art systems known to Applicants do not provide a mechanism for metering the amount of waste material input to the heated enclosure, and contain no effective way of monitoring the vacuum within the system at potential leak sites. Conventional packing was used on the end of auger tube shafts to maintain a vacuum.

Other prior art systems for recycling waste into energy include U.S. Pat. Nos. 4,624,417; 4,769,149; 4,857,458; 4,882,903; 5,429,645; 5,996,512; 6,938,562; and 6,848,375, as well as Patent Application Publications 2004/0103831 and 2004/0192980.

The disadvantages of the prior art are overcome by the present invention, and an improved system and method are hereinafter disclosed for converting solid waste into energy in a highly efficient manner.

SUMMARY OF THE INVENTION

In one embodiment, a system for recycling solid waste into energy utilizes solid waste particles having a cross-sectional size less than 1 inch in length. The system comprises a heated enclosure having an interior chamber and a plurality of internal baffles within the heated chamber, one or more input conveyors for inputting waste particles to the heated enclosure, and a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids. A heated conveyor within the flow line mechanically moves the waste particles and the residual solids along the flow line. A heated rotary drum is provided in fluid communication with the flow line for receiving the waste particles and the residual solids, with the rotary drum having an interior temperature of from 730° F. to 800° F. for generating hydrocarbon vapors and carbon black solids. A condenser is in fluid communication with the flow line and the rotary drum for receiving the vapors from the flow line and the rotary drum and outputting liquids including hydrocarbons and gas including hydrocarbons. One or more discharge conveyors are provided for discharging the carbon black solids from the rotary drum. Two or more input control valves are each positioned along the one or more input conveyors for sealing vacuum downstream from the one or more input conveyors, with each input control valve having two or more axially spaced closure gates. Similarly, two or more discharge control valves are positioned along the one or more discharge conveyors for sealing vacuum upstream from the one or more discharge conveyors, with each discharge control valve having two or more axially spaced closure gates. A vacuum pump maintains a selective vacuum of less than 5 inches of water between the two or more input valves and the two or more discharge valves, such that hydrocarbon vapors are drawn from the flow line and the rotary drum into the condenser.

In another embodiment, the system for recycling waste energy includes a heated enclosure, one or more input conveyors, a flow line within the heated enclosure, a heated conveyor within the flow line, a rotary drum, a condenser, one or more discharge conveyors, one or more input control valves, and one or more discharge control valves. Each of the one or more input conveyors, the one or more discharge conveyors, and the conveyor within the flow line includes a rotary auger. Each rotary auger is rotated by a drive motor and a gearbox, with a seal engaging a rotary shaft connected to each auger for sealing vacuum, and a back-up sealed enclosure downstream from the seal for sealing the auger seal from atmosphere. A vacuum pump maintains a selective vacuum of less than 5 inches of water within the condenser, such that hydrocarbon vapors are drawn from the flow line into the condenser.

In yet another embodiment, the system includes a heated enclosure, one or more input conveyors, a heated conveyor within the flow line, a condenser, one or more discharge conveyors, one or more input control valves, one or more discharge control valves, a vacuum pump, and a plurality of leak detector sensors for detecting a leak within the vacuum system between the one or more input control valves and the one or more discharge control valves. A flow meter is provided for measuring a flow rate of hydrocarbon vapors to the condenser, and each of the one or more input conveyors, the one or more discharge conveyors, and the heated conveyor within the flow line includes a rotary auger. A processor is provided for controlling the rotational rate of each rotary auger in response to the flow meter and the plurality of leak detector sensors.

These and further features and advantages of the present invention will become apparent from the following detailed description, wherein reference is made to the figures in the accompanying drawings.

BRIEF DESCRIPTION OF THE DRAWINGS

FIG. 8 illustrates in greater detail a roto-disk valve assembly, and FIG. 9 illustrates a double dump valve assembly.

DETAILED DESCRIPTION OF PREFERRED EMBODIMENTS

A system according to the present invention is well suited for converting various types of waste materials into energy, and for the purposes of explanation as discussed below is used to convert waste rubber particles of a type formed from worn tires into energy. Those skilled in the art will appreciate, however, that the system and method disclosed herein may be used to convert various other types of waste materials into energy as discussed below.

Figure 1:
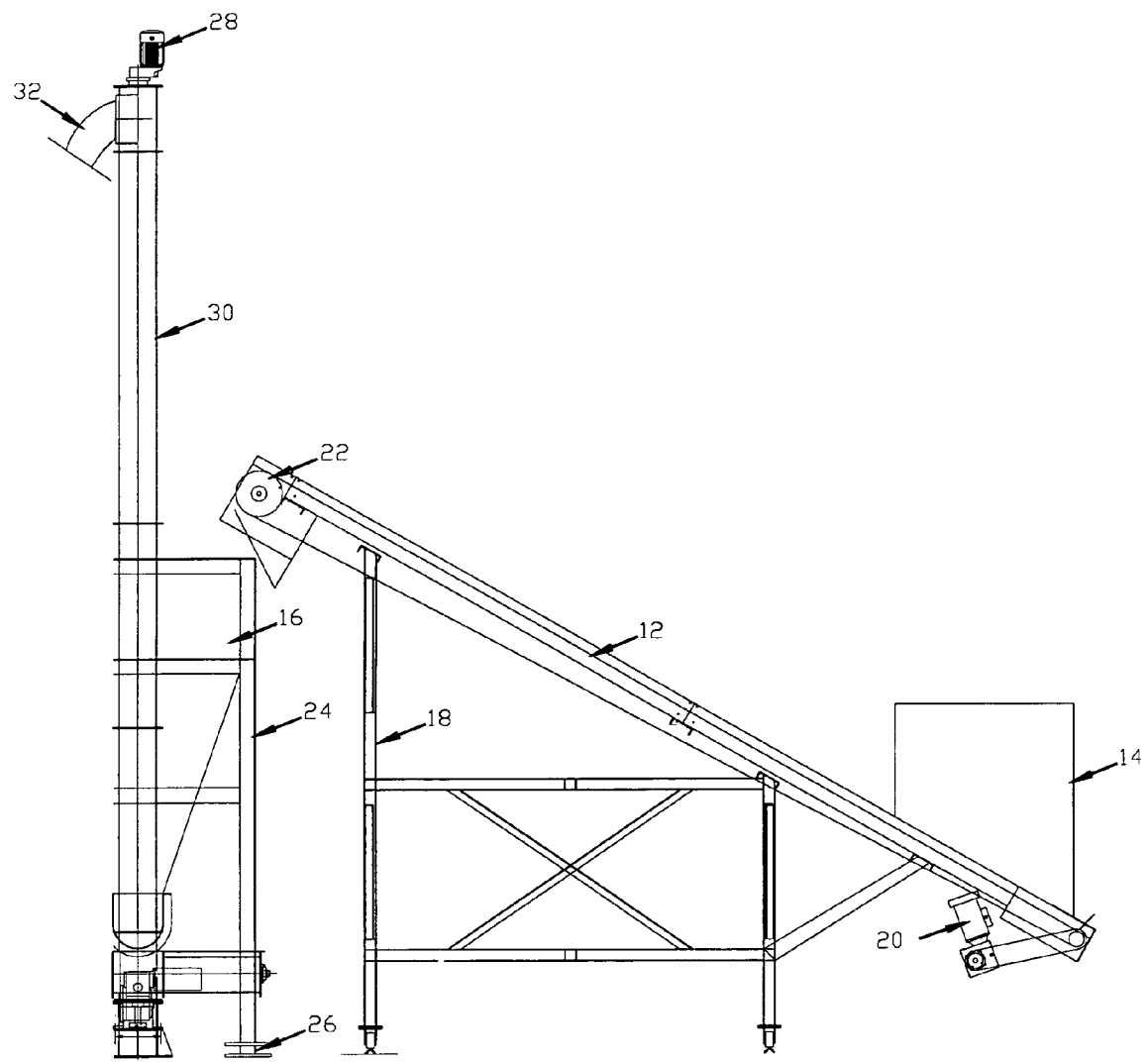
FIG. 1 is a side view belt of a conveyor and vertical auger for initially feeding waste material into a heated enclosure.

FIG. 1 illustrates a belt conveyor 12 which may be used to convey rubber particles from an initial dump hopper 14 into a staging hopper 16. The conveyor 12 may be supported on a suitable frame structure 18, with a motor and gearbox assembly 20 used to power the conveyor 12. A magnetic drum 22 is provided adjacent a discharge end of the conveyor 12 for minimizing the amount of metal input to the hopper 16.

The hopper 16 may be provided with a support structure 24 which includes a plurality of load cells 26 for measuring the weight of the material in the hopper. Since the conveyor 12 may be powered only intermittently as need to maintain material in hopper 16, periodic measurements from the load cells 26 may thus be used to calculate the amount of material being input to the system over time. Material from the hopper 16 is input to the vertical auger conveyor 30, which is powered by a drive unit 28. Waste material is discharged from the upper end of the auger conveyor 30 to discharge pipe 32, which flows into the double-dump valve 34 (see FIG. 2) which includes a pair of axially spaced gates 36, 38. One of the gates 36, 38 is normally closed when the other gate is open, thereby providing a seal for the vacuum downstream from the valve 34.

Waste material passing through the valve 34 is input to auger conveyor 40, which houses a conventional screw-type auger 42 rotated by drive motor and gearbox assembly 44. Material discharged from conveyor 40 passes through a roto disc valve 46, which also has a pair of axially spaced gates 48, 50. Material passing through the valve 46 is input to another conveyor 52 having an internal auger 54 powered by a motor and gearbox assembly 56. A suitable double dump valve 34 is the Model H-0822-11 valve manufactured by Plattco, and a suitable roto disc valve is the Model RD-5402-1 valve manufactured by Roto-Disc. FIGS. 8 and 9 show the roto disk valve 46 in greater detail, with the pair of gates 48, 50. FIG. 9 illustrates the double dump valve 36 with the pair of gates 36, 38.

The Roto-Disc valve 46 is in series with the double-dump valve 34, which in turn is in series with the substantially vertical auger conveyor 30. This system provides three separate mechanisms for maintaining a vacuum within the system while allowing waste material to pass into the system, with the valves 46 and 34 each including a pair of axially spaced gates. Any gas which bypasses the valves 46 and 34 is thus substantially plugged within the system by the waste material within the vertical auger 30. The plugging effect of the materials in the vertical auger conveyor 30 along with the valves 34, 46 thus provide at least a triple redundancy to maintain vacuum within the system.

Figure 2:
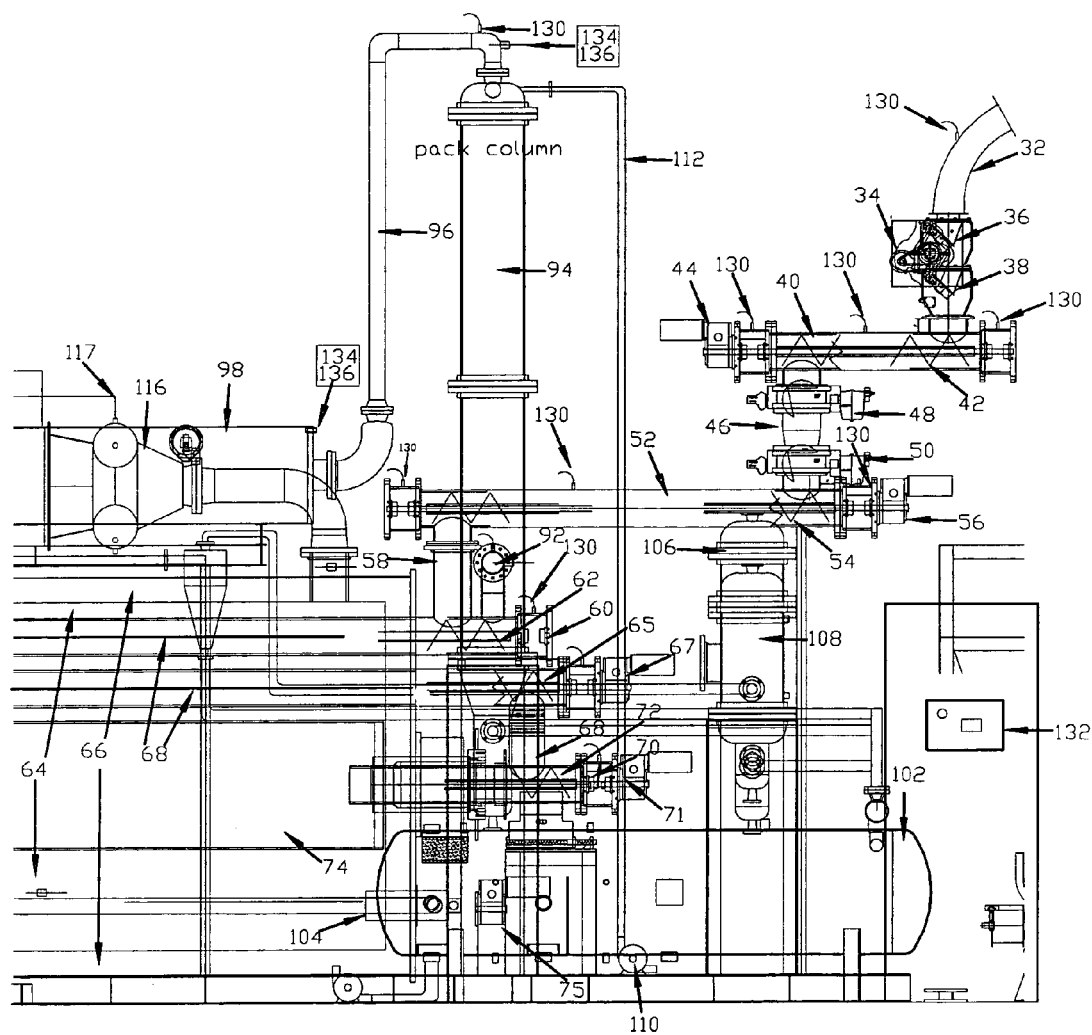
FIG. 2 is a side view of additional conveyors, a portion of a heated enclosure and a condensing column.
Figure 3:
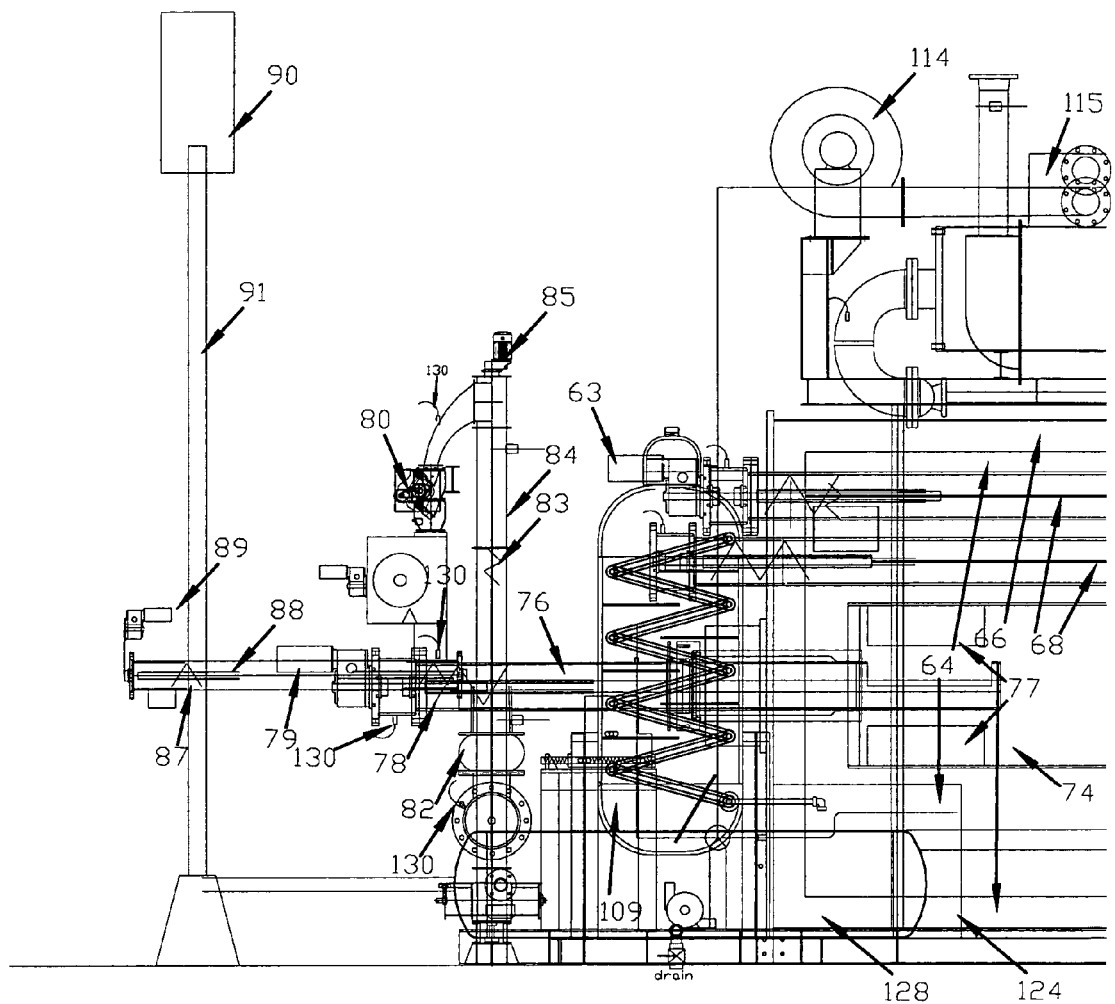
FIG. 3 is a side view of another portion of the condensing column and heated enclosure, as well as a discharge conveyor and a flare stack.

Referring still to FIG. 2, waste material is discharged from the auger conveyor 52 into the conduit 58, where it drops by gravity into the horizontal conveyor 60 with an auger 62 powered by motor and gearbox assembly 63 (see FIG. 3). Conveyor 60 and the auger 62 in turn are received within the interior chamber 64 of the heated enclosure 66, which includes a plurality of baffles 68 for maintaining a desired temperature profile within the heated enclosure. Material passing through the conveyor 60 is thus heated to produce hydrocarbon vapors and residual solids. More particularly, material passes through the conveyor 60 to the left as shown in FIG. 2, and then drops to a similar conveyor 67 which includes an auger 65 for moving material to the right, as shown in FIG. 2. If desired, another conveyor may be in parallel with conveyor 67 to increase the surface area of exposed material. Conveyor auger 65 may be powered by motor and gearbox assembly 63. Conveyors 60 and 67 form a flow line positioned with respect to the plurality of baffles to provide a temperature gradient along the low line of at least 150 F.°, while the augers mechanically move the waste material and residual solids through the flow line. Material discharged from the conveyor 67 drops by conduit 68 to yet another horizontal conveyor 70, which similarly has an auger 72 powered by motor and a similar gearbox assembly 63. Conveyor 70 reintroduces the material into the heated enclosure 66, and more particularly into rotary drum 74 which may be rotated by drive unit 75. The heated rotary drum 74 is thus in fluid communication with the flow line formed by the conveyors 30 and 67, and receives waste particles and residual solids from the flow line. Accordingly to the present invention, the interior temperature within the rotary drum 74 is maintained at from 730° F. to 800° F. for generating hydrocarbon vapors and carbon black solids.

As shown in FIG. 3, material discharged from the rotary drum 74 is input to the conveyor 76, which also includes an auger 78 powered by motor and gearbox assembly 79. Carbon black solids discharged from the conveyor 76 are passed downward through a roto disc valve 82, then upward through a vertical conveyor 84, where the carbon black within the conveyor 84 acts as a plug to assist in maintaining vacuum in the system. The auger 83 in the vertical conveyor 84 is powered by motor and gearbox assembly 85. Material discharged from the conveyor 84 passes downward through a double pump valve 80, and is finally discharged through conveyor 88 with auger 87 powered by a similar drive. A nitrogen supply system 89 supplies nitrogen to the carbon black solids discharged from the conveyor 88. Dry cooled nitrogen may thus be fed through the carbon exit assembly on the conveyor 88 to provide an inert atmosphere for neutralizing the volatility of the hot hydrocarbons and to cool these solids. A bag type dust collecting filtration system (not shown) may be used to reduce dust from the discharge carbon block solids. Any remaining gases may exit the conveyor 88 through the vertical stack 91, and be burned in flare chamber 90, although flaring may only be necessary in the event of an emergency.

Returning again to FIG. 2, hydrocarbon vapors from the conveyors 62 and 67 may pass by conduit 92 into the condensing column 94, which may then pass uncondensed vapors via line 96 to condenser 98. Accordingly to the present invention, the condensing column 94 may be provided upstream from the condenser 98 for initially separating liquids and gases, and hydrocarbon vapors are input into a lower portion of the condensing column. Hydrocarbon vapors thus travel by vacuum in an opposite direction of the feed material through the conveyor 62. The condensing column 94 may utilize stainless steel pall rings to provide the surface area desired to start the first step of condensing.

Hydrocarbon vapors leaving the condenser 98 may be passed to a demister 106, and then to a vacuum liquid ring or gas scrubber 108. A majority of the hydrocarbon vapors are liquefied in condensing column 94, and further vapors are condensed in condenser 98. The demister 106 and the liquid ring 108 remove substantially the remaining portion of the gas vapors, so that any gas discharged from the gas chiller 109 may serve as a feedstock to the burner 104, or may be passed to a pipeline or storage tank. The gas chiller may be provided with a vacuum pump for dropping remaining heavy hydrocarbons to a liquid form. The remaining gas may be directed to the burner of the heated enclosure. A water/oil separator 102 may be provided for separating liquid carbons from water, with most of the water occurring as a result of the steam input to the heated enclosure. The reflux pump 110 may be provided for inputting a relatively low volume of oil to the top of the column 98 through the flux line 112, with this oil acting as a quenching material to enhance the condensing process. A blower 114 (see FIG. 3) may be provided for inputting air to the burner 104 within the heated enclosure 66, and may be passed through the air to air heat exchanger 115 to warm the air before entering the heat enclosure, thereby increasing efficiency.

Figure 4:
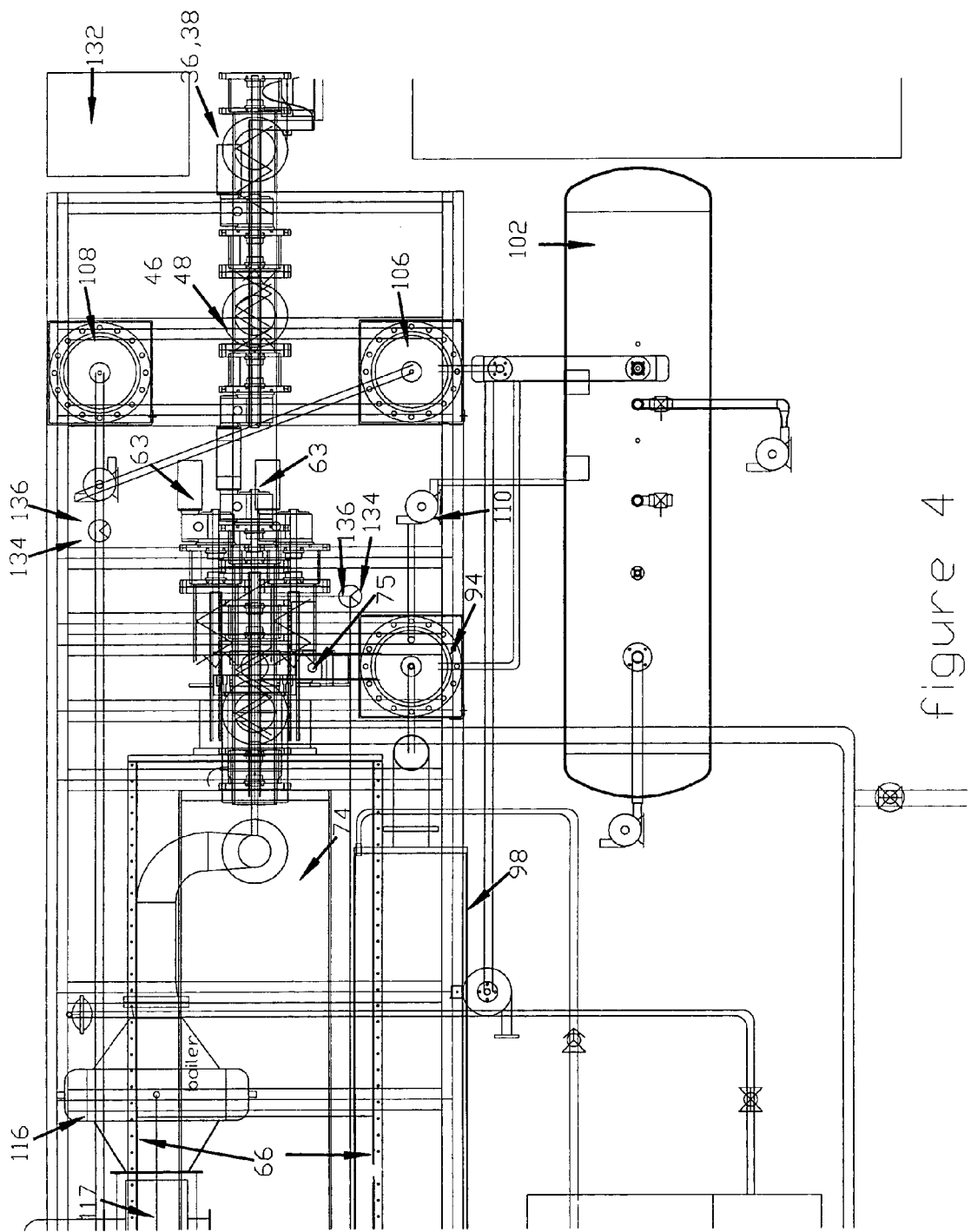
FIG. 4 is a top view of the equipment shown in FIG. 2.

A boiler 116 (see FIG. 4) preferably powered by the hydrocarbons produced by the system may receive treated water and produce a relatively low volume, high temperature steam, which is preferably at a temperature greater than 800° F. into the rotary drum 74 for stripping remaining hydrocarbons from the material. FIG. 4 is a top view of the equipment shown in FIG. 2, and more particularly illustrates a heated flowline 117 from the enclosure 66 to a boiler 116, which produces steam which is input to the enclosure. Low pressure high temperature steam input to the heated enclosure.

Figure 5:
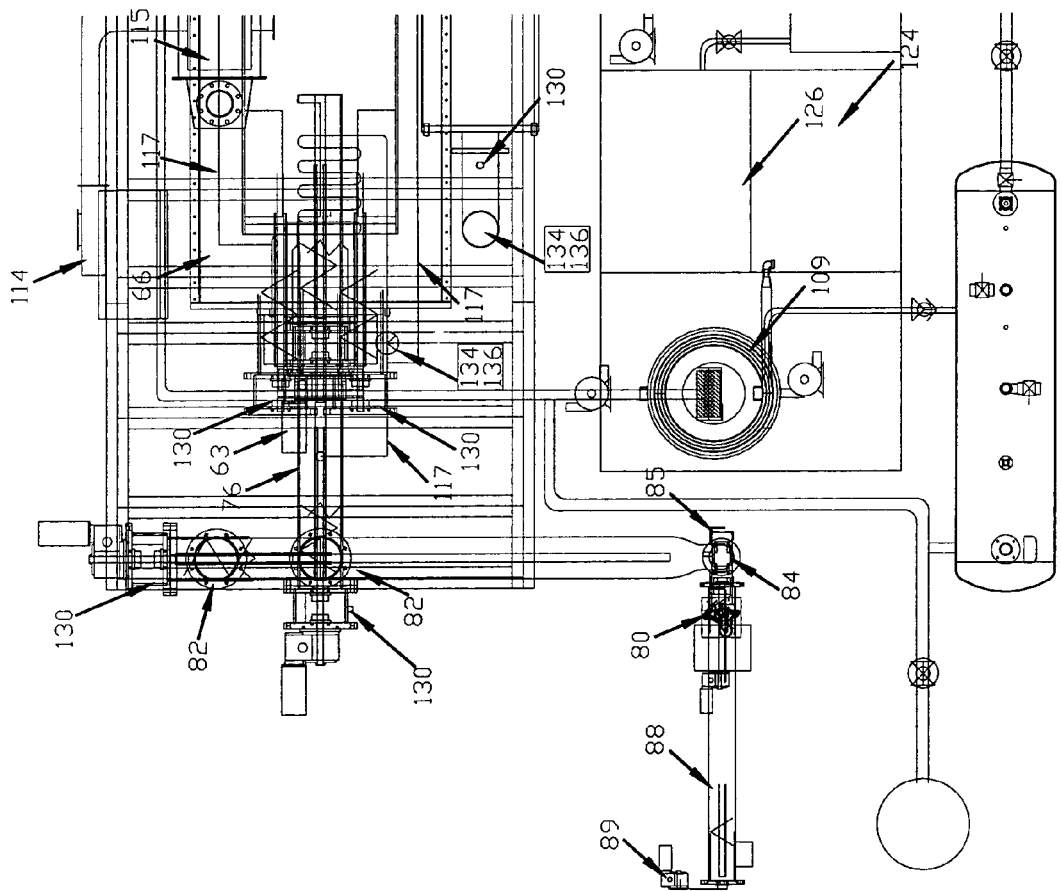
FIG. 5 is a top view of the equipment shown in FIG. 3.

A refrigeration unit 124 as shown in FIG. 3 may be provided for gas and water cooling. A separate water chiller 126 (see FIG. 5) may also be provided, and a gas accumulator tank 128 is also shown in FIG. 4.

Temperature and/or vacuum sensors 130 may be provided at the various locations in the system to quickly identify leaks, and to quickly locate a leak, and to provide a temperature of the material at this stage of the process. Signals from each of the signals may thus be input to a master control station 132 shown in FIGS. 2 and 4, which includes one or more conventional computers. One or more digital flow meters 134 and digital pressure switches 136 may be provided for measuring the flow rate of gas to the condenser column or the flow rate of gas to various other pieces of the system, with the pressure switches providing an accurate reading of the pressure at selected locations within the system. The system may include digital flow meters and digital pressure gauges that will communicate with the computer.

The conveyors within the heated enclosure may thus be operated with a level of one third material or less within each auger conveyor to increase the surface area of exposed material. The material may be retained within the enclosure 66 during a retention time of less than 15 minutes, and typically more than 8 minutes. The retention time of from 10 to 12 minutes will be appropriate for many materials.

Figure 6:
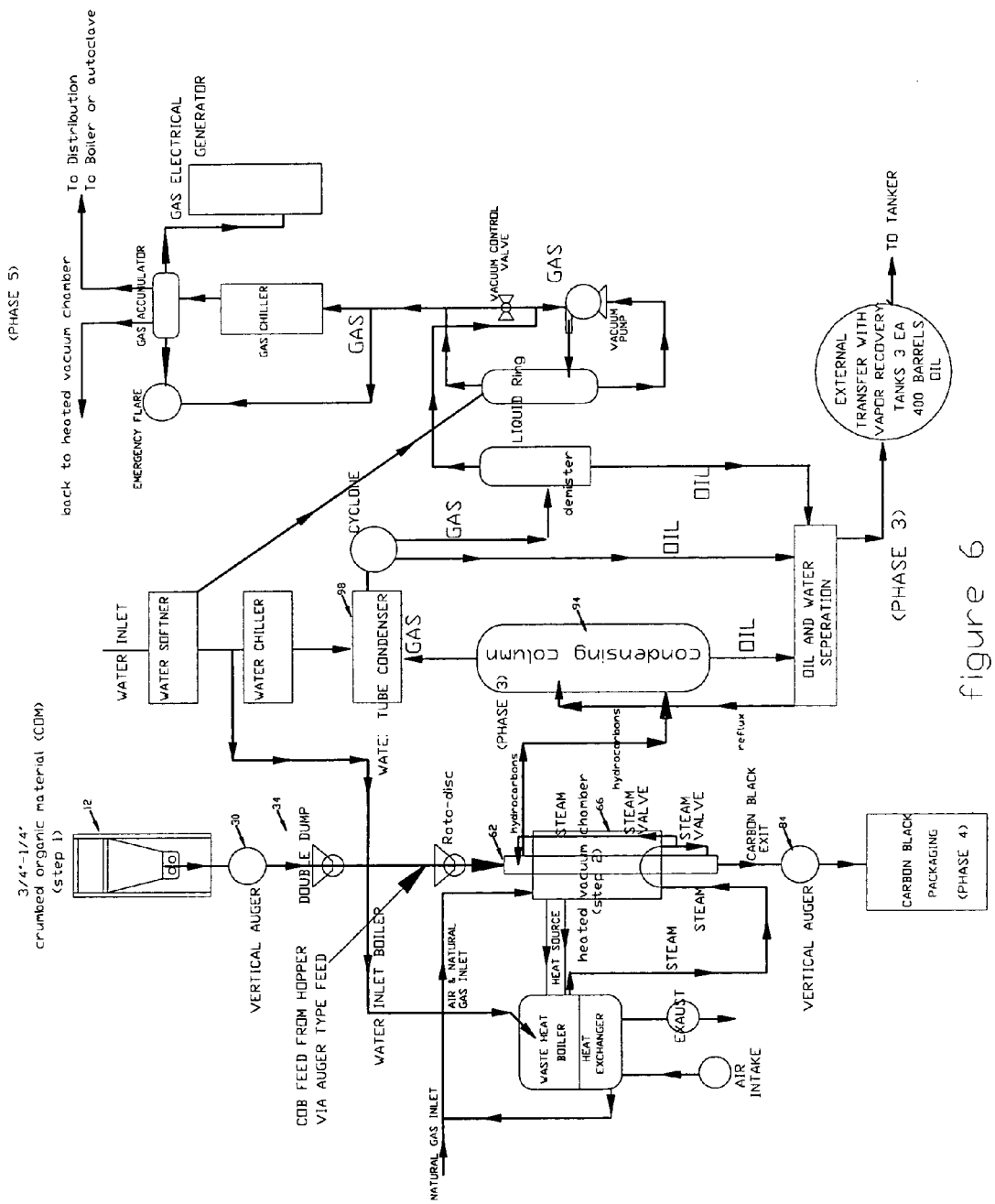
FIG. 6 is a schematic representation of a suitable system according to the present invention.

FIG. 6 illustrates many of the primary components of the system in schematic form. Material from the conveyor 12 thus passes upward through the vertical auger 30, through the double-dump valve 34, and through the conveyor 62 into the heated enclosure 66. Carbon black discharged from the enclosure is passed through the vertical auger 84 and may then be packaged.

Hydrocarbons discharged from the heated enclosure 66 pass to the condensing column 94, with gas continuing to the water tube condenser 98, and are then input by a cyclone pump to a demister, and finally to a gas chiller. A liquid ring with a vacuum pump may be spaced fluidly between the fragmentator and the gas chiller. Other than the gas released through an emergency flare, gas from the chiller may be input to a gas accumulator, and to a gas electrical generator. Some of the gas may be returned to the heated enclosure, and other gas may pass to the boiler. Produced hydrocarbons may thus be recovered in holding tank 102, and may be passed to a burner 104 within the heated enclosure 66 to generate heat. The system may thus primarily run on its own produced gas once the reaction starts to occur.

A water condenser is provided with internal coils preferably fabricated from stainless steel. Water may be treated with a water softening system and will be continuously circulated through a water chiller while flowing through the condenser to maintain a constant temperature and reduce the rate of corrosion. The water softener may be used to input water to the liquid isolation chamber, and also the waste heat boiler. Steam from the boiler may be input to the heated enclosure 66, as discussed above. The oil and water separator 102 may receive oil and water from various locations in the system, but primarily from the condensing column 94.

Figure 7:
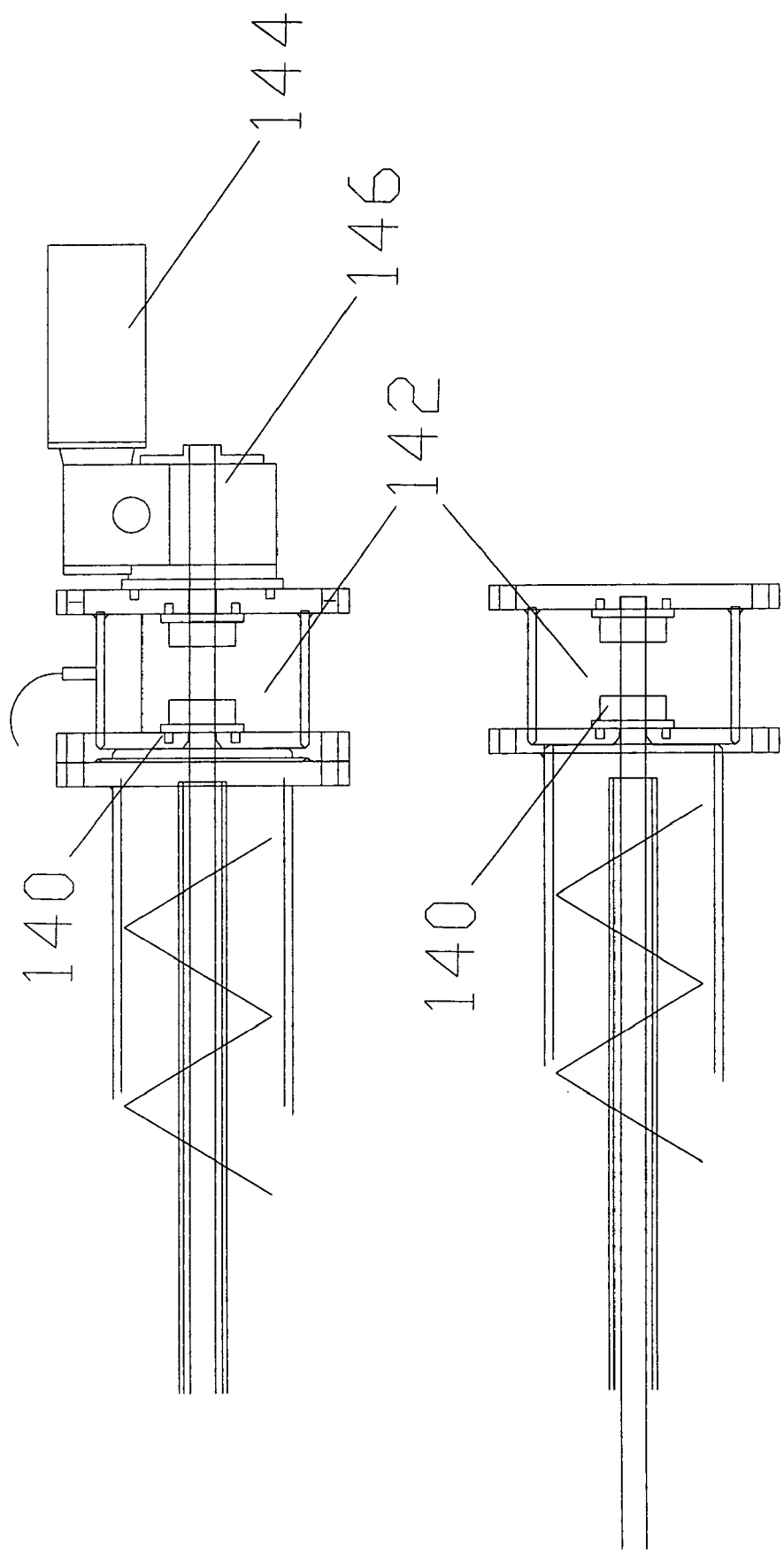
FIG. 7 illustrates a powered end and a driven end of an auger shaft, an auger seal dynamically sealing with an auger shaft, and an enclosure for fluidly isolating the auger seal from atmosphere.

Each of the conveyors with augers therein may include a machine shaft seal, a shaft housing, a direct drive motor, and a gearbox. FIG. 7 depicts an auger shaft with a shaft seal 140 and an enclosure 142 which fluidly isolates the shaft seal from the environment for redundancy. The motor may be a hydraulic, pneumatic or electrically powered motor 144, and may drive a gearbox 146 or another transmission device. The auger motor may include a programmable drive which monitors amperage and rpms of the auger, and may thus be tied to a master computer.

The present invention may sufficiently convert various materials, including but not limited to waste materials, and to energy and non-energy byproducts. In addition to rubber particles from tires as disclosed herein, the invention may be used to convert solid waste, sewage sludge, animal waste, trash and refuge, solid industrial waste, coal or other solid fossil fuels into energy. Waste plastics and waste fat from animals, fryer oils and other food processing wastes may also be converted into useful products according to the present invention. The system avoids many of the problems of prior attempts to efficiently convert waste material into energy by avoiding the requirement of a fluidized bed or other special reactions. Solid material need not be specially treated or prepared into a slurry before being heated to release hydrocarbons. The system of the present invention is relatively compact and can be placed in a small location, with the emissions from the system being relatively clean and non-hazardous. By providing a system which is essentially operating under a vacuum, the likelihood of inadvertent release of gases is minimized, while the vacuum pump draws the hydrocarbon vapors, preferably in a counter flow direction from the particles moving through the system, toward the condenser units.

A particular feature of the invention is that, in addition to or in some cases separate from producing energy, the equipment of the present invention may be used to produce valuable byproducts from waste materials including cleaners, solvents, and other valuable chemicals used in various industrial, oilfield, and pipeline operations. Another significant advantage of the invention is that the system does not require specialized equipment, but rather utilizes components which are generally readily available from a variety of sources.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A system for recycling rubber tires into energy, the rubber tires having a cross-sectional particle size less than one inch in length, the system comprising:
    a heated enclosure having an interior chamber and a plurality of internal baffles within the heated chamber;
    one or more input conveyors for inputting rubber particles to the heated enclosure and having a flow line positioned with respect to the plurality of baffles to provide a temperature gradient along the flow line of at least 150 F.°, thereby producing hydrocarbon vapors and residual solids, the input conveyors mechanically moving the rubber particles and the residual solids along the flow line;
    a drum magnet upstream from the one or more input conveyors for removing metal particles from rubber particles;
    a heated rotary drum in fluid communication with an exit from the flow line for receiving the rubber particles and residual solids from the flow line, the rotary drum having an interior temperature of from 730° F. to 800° F. for generating hydrocarbon vapors and carbon black solids;
    a condenser in fluid communication with the flow line and the rotary drum for receiving the vapors from the flow line and the rotary drum and outputting liquids including hydrocarbons and gas including hydrocarbons;
    one or more discharge conveyors for discharging the carbon black solids from the rotary drum;
    two or more input control valves for sealing vacuum downstream from the one or more input conveyors, each input control valve having two or more axially spaced closure gates;
    two or more discharge control valves for sealing vacuum upstream from the one or more discharge conveyors, each discharge control valve having two or more axially spaced closure gates; and
    a vacuum pump for maintaining a selected vacuum of less than 5 inches of water between the two or more input valves and the two or more discharge valves, such that hydrocarbon vapors are drawn from the flow line and the rotary drum into the condenser.

2. The system as defined in claim 1, wherein at least a portion of the one or more of the gas including hydrocarbons and the liquids including hydrocarbons are input into a burner within the heated enclosure.

3. The system as defined in claim 2, wherein a drum sensor senses a temperature within the rotating drum; and
    fuel to the burner is controlled as a function of the measured drum temperature.

4. The system as defined in claim 1, further comprising:
    a substantially vertical input conveyor in fluid communication with the two or more input control valves for providing a plug of waste material for minimizing vacuum loss.

5. The system as defined in claim 1, further comprising:
    a substantially vertical waste conveyor in fluid communication with the two or more discharge control valves for providing a plug of carbon block solids for minimizing vacuum loss.

6. The system as defined in claim 1, wherein:
    each of the one or more input conveyors, the one or more discharge conveyors, and the heated conveyor within the flow line includes a rotary auger; and
    each rotary auger is rotated by a drive motor and gearbox, a seal engaging a rotary shaft connected to each auger for sealing vacuum, and a sealed enclosure downstream from the seal for containing gases which pass by the seal.

7. The system as defined in claim 6, further comprising:
    one or more rpm sensors for monitoring a rotational rate of the rotary augers.

8. The system as defined in claim 6, wherein each auger is driven by the motor and gearbox to rotate at less than 10 rpm.

9. The system as defined in claim 1, wherein the flow line extends in one axial direction within the heated chamber and extends in a substantially opposing axial direction within the heated chamber.

10. The system as defined in claim 1, further comprising:
    a nitrogen supply system to supply nitrogen to carbon black solids discharged from the one or more discharge conveyors.

11. The system as defined in claim 1, further comprising:
    a water chiller for cooling hydrocarbon vapors passing through the condenser.

12. The system as defined in claim 1, further comprising:
    a condensing column upstream of the condenser for separating liquids and gases, hydrocarbon vapors being input into a lower portion of the condensing column.

13. The system as defined in claim 1, further comprising:
    a plurality of sensors for detecting a leak within a vacuum system between the two or more input control valves and the two or more discharge control valves.

14. The system as defined in claim 1, further comprising:
    one or more load cells for measuring a weight of rubber particles in a hopper upstream from the one or more input conveyors, thereby providing an input weight of rubber particles as a function of time.

15. The system as defined in claim 1, further comprising:
    a steam line for inputting steam at a temperature of greater than 800° F. into the rotary drum.

16. The system as defined in claim 15, further comprising:
    a boiler heated by at least one of the gas including hydrocarbons and the liquids including hydrocarbon to provide steam to the steam lines.

17. The system as defined in claim 1, wherein a vacuum pump maintains a selected vacuum between the two or more input valves and the two or more discharge valves of from 0.5 inches to 2.5 inches of water.

18. A system for recycling waste into energy, the system comprising:
    a heated enclosure having an interior chamber and a plurality of internal baffles within the heated chamber;
    one or more input conveyors for inputting waste particles to the heated enclosure;
    a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids;
    a heated conveyor within the flow line mechanically moving the waste particles and the residual solids along the flow line;
    a heated rotary drum in fluid communication with an exit from the flow line for receiving the waste particles and residual solids from the flow line, the rotary drum having an interior temperature of from 730° F. to 800° F. for generating hydrocarbon vapors and carbon black solids;
a condenser in fluid communication with the flow line and the rotary drum for receiving the vapors from the flow line and the rotary drum and outputting liquids including hydrocarbons and gas including hydrocarbons;
one or more discharge conveyors for discharging the carbon black solids from the rotary drum;
one or more input control valves positioned along the one or more input conveyors for sealing vacuum downstream from the one or more input conveyors, the input control valve having two or more axially spaced closure gates;
one or more discharge control valves positioned along the one or more discharge conveyors for sealing vacuum upstream from the one or more discharge conveyors, the discharge control valve having two or more axially spaced closure gates;
each of the one or more input conveyors, the one or more discharge conveyors, and the heated conveyor within the flow line includes a rotary auger;
at least a portion of one or more of the gas including hydrocarbons and the liquids including hydrocarbons are input into a burner within the heated closure;
a drum sensor senses a temperature within the rotating drum;
fuel to the burner is controlled as a function of the measured drum temperature;
each rotary auger is rotated by a drive motor and gearbox, a seal engaging a rotary shaft connected to each auger for sealing vacuum, and a sealed enclosure downstream from the seal for containing gases which pass by the seal; and
a vacuum pump for maintaining a selected vacuum of less than 5 inches of water between the one or more input control valves and the one or more discharge control valves, such that hydrocarbon vapors are drawn from the flow line and the rotary drum into the condenser.

19. The system as defined in claim 18, further comprising: one or more rpm sensors for monitoring a rotational rate of one or more of the augers.

20. The system as defined in claim 18, wherein the one or more input conveyors and the one or more waste conveyors comprise:
a substantially vertical input conveyor in fluid communication with the one or more input control valves for providing a plug of waste material for minimizing vacuum loss; and
a substantially vertical waste conveyor in fluid communication with the one or more discharge control valves for providing a plug of carbon black solids for minimizing vacuum loss.

21. The system as defined in claim 18, further comprising: a plurality of sensors for detecting a leak within a vacuum system between the one or more input control valves and the one or more discharge control valves.

22. The system as defined in claim 18, further comprising: a steam line for inputting steam at a temperature of greater than 800° F. into the rotary drum; and
a boiler heated by at least one of the gas including hydrocarbons and liquids including hydrocarbon for generating steam to the steam lines.

23. The system as defined in claim 18, further comprising: a condensing column upstream of the condenser for separating liquids and gases, hydrocarbon vapors being input into a lower portion of the condensing column.

24. The system as defined in claim 18, further comprising: a water chiller for cooling hydrocarbon vapors passing through the condenser.

25. The system as defined in claim 18, further comprising: a nitrogen supply system to supply nitrogen to carbon black solids discharged from the one or more discharge conveyors.

26. A system for recycling waste into energy, the system comprising:
a heated enclosure having an interior chamber and a plurality of internal baffles within the heated chamber;
one or more input conveyors for inputting waste particles to the heated enclosure;
a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids;
a heated conveyor within the flow line mechanically moving the waste particles and the residual solids along the flow line;
a heated rotary drum in fluid communication with the flow line for receiving the waste particles and residual solids from the flow line, the rotary drum having an interior temperature of from 730° F. to 800° F. for generating hydrocarbon vapors and carbon black solids;
a steam line for inputting steam at a temperature of greater than 800° F. into the rotary drum;
a condenser in fluid communication with the flow line for receiving the vapors from the flow line and outputting liquids including hydrocarbons and gas including hydrocarbons;
one or more discharge conveyors for discharging the residual solids;
one or more input control valves each positioned along the one or more input conveyors for sealing vacuum downstream from the one or more input conveyors;
one or more discharge control valves each positioned along the one or more discharge conveyors for sealing vacuum upstream from the one or more discharge conveyors;
a vacuum pump for maintaining a selected vacuum of less than 5 inches of water between the one or more input valves and the one or more discharge valves, such that hydrocarbon vapors are drawn from the flow line and the rotary drum into the condenser;
a plurality of leak detector sensors for detecting a leak within a vacuum system between the one or more input control valves and the one or more discharge control valves;
each of the one or more input conveyors, the one or more discharge conveyors, and the heated conveyor within the flow line includes a rotary auger;
one or more rpm sensors for monitoring a rotational rate of one or more of the augers; and
a processor for controlling a rotational speed of each rotary auger in response to the flow meter and the plurality of leak detector sensors.

27. The system as defined in claim 18, wherein at least a portion of one of the gas including hydrocarbons and the liquids including hydrocarbons are input into a burner within the heated closure.

28. The system as defined in claim 26, wherein each rotary auger is rotated by a drive motor and gearbox, a seal engaging a rotary shaft connected to each auger for sealing vacuum, and a sealed enclosure downstream from the seal for containing gases which pass by the seal.

29. The system as defined in claim 26, wherein the flow line extends in one axial direction within the heated chamber and extends in a substantially opposing axial direction within the heated chamber.

30. The system as defined in claim 26, wherein a vacuum pump maintains a selected vacuum of from 0.5 inches to 2.5 inches of water between the one or more input control valves and the one or more discharge control valves.

31. The system as defined in claim 26, further comprising:
a condensing column upstream of the condenser for separating liquids and gases, hydrocarbon vapors being input into a lower portion of the condensing column.

32. The system as defined in claim 18, wherein the flow line extends in one axial direction within the heated chamber and extends in a substantially opposing axial direction within the heated chamber.

33. The system as defined in claim 18, wherein a vacuum pump maintains a selected vacuum of from 0.5 inches to 2.5 inches of water between the one or more input control valves and the one or more discharge control valves.

34. The system as defined in claim 26, wherein a drum sensor senses a temperature within the rotating drum; and
fuel to the burner is controlled as a function of the measured drum temperature.

35. The system as defined in claim 26, wherein the one or more input conveyors and the one or more discharge conveyors comprise:
a substantially vertical input conveyor in fluid communication with the one or more input control valves for providing a plug of waste material for minimizing vacuum loss; and
a substantially vertical discharge conveyor in fluid communication with the one or more discharge control valves for providing a plug of carbon black solids for minimizing vacuum loss.

36. A system for recycling waste into energy, the system comprising:
a heated enclosure having an interior chamber and a plurality of internal baffles within the heated chamber;
one or more input conveyors for inputting waste particles to the heated enclosure;
a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids;
a heated conveyor within the flow line mechanically moving the waste particles and the residual solids along the flow line;
a condenser in fluid communication with the flow line for receiving the vapors from the flow line and outputting liquids including hydrocarbons and gas including hydrocarbons;
one or more discharge conveyors for discharging the residual solids;
one or more input control valves each positioned along the one or more input conveyors for sealing vacuum downstream from the one or more input conveyors;
one or more discharge control valves each positioned along the one or more discharge conveyors for sealing vacuum upstream from the one or more discharge conveyors;
a vacuum pump for maintaining a selected vacuum of less than 5 inches of water between the one or more input valves and the one or more discharge valves, such that hydrocarbon vapors are drawn from the flow line and the rotary drum into the condenser; and
the heated conveyor within the flow line including a rotary auger rotated by a drive motor and gearbox, a seal engaging a rotary shaft connected to the auger for sealing vacuum, and a sealed enclosure downstream from the seal for containing gases which pass by the seal.

37. The system as defined in claim 36, wherein the flow line extends in one axial direction within the heated chamber and extends in a substantially opposing axial direction within the heated chamber.

38. The system as defined in claim 36, further comprising:
a heated rotary drum in fluid connection with the flow line for receiving the waste particles and residual solids from the flow line, the rotary drum having an interior temperature of from 730° F. to 800° F. for generating hydrocarbon vapors and carbon black solids.

39. The system as defined in claim 36, wherein a vacuum pump maintains a selected vacuum of from 0.5 inches to 2.5 inches of water between the one or more input control valves and the one or more discharge control valves.

40. The system as defined in claim 36, wherein the one or more input conveyors and the one or more discharge conveyors comprise:
a substantially vertical input conveyor in fluid communication with the one or more input control valves for providing a plug of waste material for minimizing vacuum loss; and
a substantially vertical discharge conveyor in fluid communication with the one or more discharge control valves for providing a plug of carbon black solids for minimizing vacuum loss.

41. A system for recycling waste into energy, the system comprising:
a heated enclosure having an interior chamber and a plurality of internal baffles within the heated chamber;
one or more input conveyors for inputting waste particles to the heated enclosure;
a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids, the flow line extending in one axial direction within the heated chamber and extending in a substantially opposing axial direction within the heated chamber;
a heated conveyor within the flow line mechanically moving the waste particles and the residual solids along the flow line;
a heated rotary drum in fluid communication with an exit from the flow line for receiving the waste particles and residual solids from the flow line, the rotary drum having an interior temperature of from 730° F. to 800° F. for generating hydrocarbon vapors and carbon black solids;
a condenser in fluid communication with the flow line and the rotary drum for receiving the vapors from the flow line and the rotary drum and outputting liquids including hydrocarbons and gas including hydrocarbons;
one or more discharge conveyors for discharging the carbon black solids from the rotary drum;
one or more input control valves positioned along the one or more input conveyors for sealing vacuum downstream from the one or more input conveyors;
one or more discharge control valves positioned along the one or more discharge conveyors for sealing vacuum upstream from the one or more discharge conveyors; and
a vacuum pump for maintaining a selected vacuum of less than 5 inches of water between the one or more input control valves and the one or more discharge control valves, such that hydrocarbon vapors are drawn from the flow line and the rotary drum into the condenser.

42. A system as defined in claim 41, wherein the one or more input conveyors and the one or more discharge conveyors comprise:
- a substantially vertical input conveyor in fluid communication with the one or more input control valves for providing a plug of waste material for minimizing vacuum loss; and
- a substantially vertical discharge conveyor in fluid communication with the one or more discharge control valves for providing a plug of carbon black solids for minimizing vacuum loss.

43. A system as defined in claim 41, wherein a vacuum pump maintains a selected vacuum of from 0.5 inches to 2.5 inches of water between the one or more input control valves and the one or more discharge control valves.

44. A system for recycling waste into energy, the system comprising:
- a heated enclosure having an interior chamber and plurality of internal baffles within the heated chamber;
- one or more input conveyors for inputting waste particles to the heated enclosure;
- a flow line within the heated enclosure in fluid communication with the one or more input conveyors for receiving waste particles and positioned with respect to the plurality of baffles to provide a temperature gradient along the flow line of at least 150 F.°, thereby producing hydrocarbon vapors and residual solids;
- a heated conveyor within the flow line mechanically moving the waste particles and the residual solids along the flow line;
- a heated rotary drum in fluid communication with an exit from the flow line for receiving the waste particles and residual solids from the flow line, the rotary drum having an interior temperature of from 730° F. to 800° F. for generating hydrocarbon vapors and carbon black solids;
- a condenser in fluid communication with the flow line and the rotary drum for receiving the vapors from the flow line and the rotary drum and outputting liquids including hydrocarbons and gas including hydrocarbons;
- a water chiller for cooling hydrocarbon vapors passing through the condenser;
- one or more discharge conveyors for discharging the carbon black solids from the rotary drum;
- one or more input control valves positioned along the one or more input conveyors for sealing vacuum downstream from the one or more input conveyors, the input control valve having two or more axially spaced closure gates;
- one or more discharge control valves positioned along the one or more discharge conveyors for sealing vacuum upstream from the one or more discharge conveyors, the discharge control valve having two or more axially spaced closure gates;
- each of the one or more input conveyors, the one or more discharge conveyors, and the heated conveyor within the flow line includes a rotary auger;
- each rotary auger is rotated by a drive motor and gearbox, a seal engaging a rotary shaft connected to each auger for sealing vacuum, and a sealed enclosure downstream from the seal for containing gases which pass by the seal; and
- a vacuum pump for maintaining a selected vacuum of less than 5 inches of water between the one or more input control valves and the one or more discharge control valves, such that hydrocarbon vapors are drawn from the flow line and the rotary drum into the condenser.

45. The system as defined in claim 44, further comprising:
one or more rpm sensors for monitoring a rotational rate of one or more of the augers.

46. The system as defined in claim 44, wherein the one or more input conveyors and the one or more waste conveyors comprise:
- a substantially vertical input conveyor in fluid communication with the one or more input control valves for providing a plug of waste material for minimizing vacuum loss; and
- the one or more discharge conveyors include a substantially vertical waste conveyor in fluid communication with the one or more discharge control valves for providing a plug of carbon black solids for minimizing vacuum loss.

47. The system as defined in claim 44, further comprising:
a nitrogen supply system to supply nitrogen to carbon black solids discharged from the one or more discharge conveyors.

48. The system as defined in claim 41, further comprising: a steam line for inputting steam at a temperature of greater than 800° F. into the rotary drum.

* * * * *